May 20, 1952  A. A. STUART, JR  2,597,135
EARTH INDUCTION SYSTEM
Filed April 18, 1945
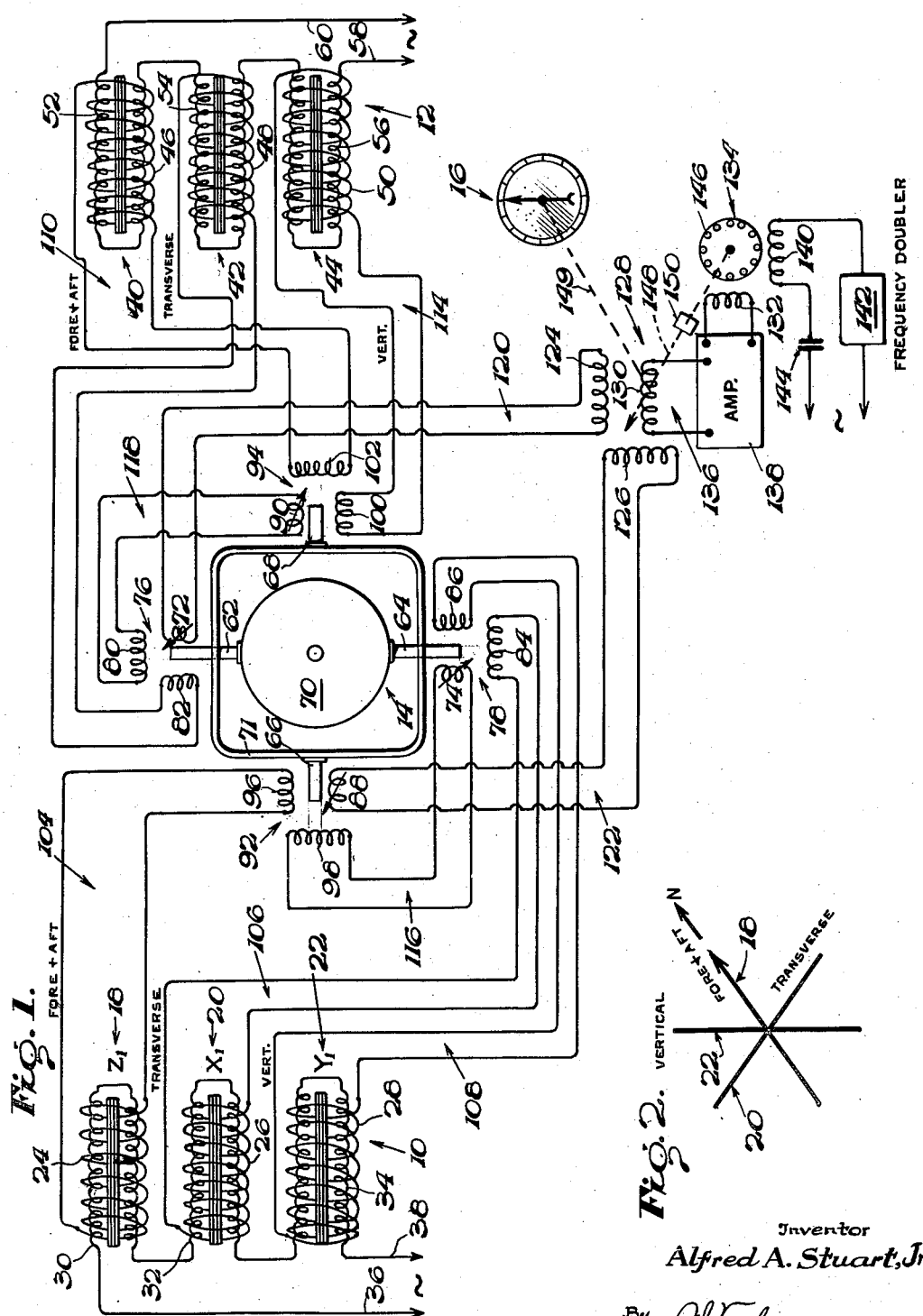
Inventor
Alfred A. Stuart, Jr.
By ⌀ Talman
ATTORNEY Patented May 20, 1952

2,597,135

UNITED STATES PATENT OFFICE 2,597,135

EARTH INDUCTION SYSTEM

Alfred A. Stuart, Jr., Hasbrouck Heights, N. J., assignor to Bendix Aviation Corporation, Teterboro, N. J., a corporation of Delaware Application April 18, 1945, Serial No. 589,032

14 Claims. (Cl. 33—224)

This invention relates to indicating or control systems and more particularly to devices wherein an earth inductor member or magnetic pickup is utilized for the indication of the direction of the earth's magnetic field, and which may be employed in certain instances, if desired, to secure a controlling function for the purpose of the automatic control of vehicles such as marine or aircraft.

One of the objects of the present invention is to provide a novel magnetic indicating or compass system of the type having a plurality of earth inductor elements which are not required to be stabilized in a horizontal plane, the system being so arranged that only the effects due to the horizontal component of the earth's magnetic field are indicated or utilized for control purposes.

A further object of the invention resides in providing a system of the type having a plurality of fixedly mounted earth inductor elements, wherein a novel circuit arrangement is utilized in connection with a gyroscopic device which is positioned remotely as respects the inductor elements, the parts cooperating in such a manner as to effect a stabilization of the earth inductor elements notwithstanding that they are fixedly mounted on the craft.

A still further object is to provide a novel system wherein the earth inductor elements or magnetic pick-ups are fixedly mounted on the craft and all signals derived from the vertical component of the earth's magnetic field are balanced out and prevented from being transmitted to the indicator so that the latter responds only to the signals derived by the pick-ups from the horizontal component of the earth's field.

Another object comprehends a system of the above type and including a pair of magnetic pick-ups, each having inductor elements which are mutually perpendicular to each other, such pick-ups being associated with a universally mounted gyroscope in such manner that the undesirable signals derived by the pick-ups from the vertical component of the earth's magnetic field are neutralized or balanced out.

Still another object includes in a system of the above character, a novel arrangement of parts so that regardless of pitch and bank conditions of the craft on which the system is mounted, the indicating or controlling device will only be responsive to the desirable signals derived from the horizontal component of the earth's magnetic field.

A further object resides in a novel construction of the above type which enables the gyroscope to be positioned at a convenient location for repair and maintenance purposes, results in a light weight construction, and secures accurate indicating and control functions irrespective of pitch and bank conditions of the craft.

Other objects, advantages and desirable features of the invention will appear more fully hereinafter from the following detailed description when taken in connection with the accompanying drawing illustrative of one form of the invention. It is to be expressly understood, however, that the drawing is utilized for purposes of illustration only and is not to be taken as a definition of the limits of the invention, reference being had for this purpose to the appended claims.

In the drawing, wherein similar reference characters denote like parts in the several views;

Figure 1 is a wiring diagram illustrating the principles of the present invention, and Figure 2 is a diagrammatic arrangement illustrating the manner of associating the three inductor elements of the two magnetic pick-ups employed in the circuit of Figure 1.

Referring more particularly to Figure 1, the present invention is illustrated therein as comprising a pair of separate and independent magnetic pick-ups 10 and 12 which are preferably fixedly mounted at some remote position in the aircraft, such as the tail or wing, such location being desirable in order to be as far removed as possible, from any disturbing local magnetic effects. Each of the pick-ups is electrically associated with an artificial horizon or gyro vertical 14, and with a course indicator or control device 16, the arrangement being such that notwithstanding the fact that the pick-ups will respond to the vertical as well as the horizontal components of the earth's magnetic field during various attitudes of the craft, the device 16 will only be responsive to the signals derived from the horizontal component. Thus, by the present invention the undesirable effects from the vertical component are eliminated in the novel circuit arrangement employed so that the device 16 will give a true and accurate indicating or control function as respects the relative position of the craft and the horizontal component of the earth's field regardless of pitch and bank movements.

Preferably, each of the pick-ups 10 and 12 is of the magnetic type which functions in accordance with the principle of an open core transformer wherein each core is saturated by an energizing winding connected with an alternating supply source, a signal voltage of double frequency being induced in each output winding in response to the components of the earth's magnetic field. The particular construction of the individual members or legs of the pick-ups forms no part of the present invention, the same constituting the subject matter of a copending application Serial No. 445,102 filed May 29, 1942 and abandoned in favor of a continuing application Serial No. 151,402, filed March 23, 1950. For the purposes of the present invention it is pointed out that the pick-up 10 includes three legs 18, 20 and 22 which are mutually perpendicular to each other and respectively arranged parallel with the fore and aft, transverse and vertical axes of the craft as shown diagrammatically in Figure 2. The legs 18, 20 and 22 are provided with respective output windings 24, 26 and 28 and input or energizing windings 30, 32 and 34, each of the latter comprising a pair of windings wound upon separate cores in series opposed relation, and connected through leads 36, 38 with a suitable source of alternating current supply, as more particularly described in the aforementioned application.

The pick-up 12 likewise includes mutually perpendicular legs 40, 42 and 44 positioned parallel to the fore and aft, transverse and vertical axes of the craft, as in Figure 2, and each respective leg comprises output windings 46, 48 and 50 together with energizing windings 52, 54 and 56, all arranged in the same manner as the corresponding windings of pick-up 10, leads 58 and 60 being connected with the same alternating supply source in order to energize the windings 52, 54 and 56.

In the functioning and operation of the pick-up 10, it will be understood that when the cores of legs 18, 20 and 22 are disposed in the earth's magnetic field and periodically saturated by the energizing windings associated therewith, a second harmonic voltage will be induced in each of the output windings 24, 26 and 28, the magnitude of such voltages being dependent upon the magnitude and relative direction of the components of the earth's magnetic field. With the arrangement of the legs, as shown in Figure 2, it will also be understood that if the craft is heading due north as indicated by the arrow N, Figure 2, and in level flight, the horizontal component of the earth's field will induce a maximum fore and aft voltage in output winding 24 and zero voltage in output windings 26 and 28. On the other hand, the vertical component of the earth's field will induce a maximum voltage in the output winding 28 and zero voltage in the output windings 24 and 26. Thus, under the assumed conditions, the fore and aft leg 18 and the vertical leg 22 will respond respectively to the horizontal and vertical components of the earth's field, while the transverse leg 20 will have no voltage induced therein. It will also be understood that under the same conditions, and considering the action of the pick-up 12, the fore and aft leg 40 and the vertical leg 44 will respond respectively to the horizontal as well as the vertical components of the earth's field, while the transverse leg 42 will have no voltage induced therein.

In the arrangement thus far described, with a given heading, pitching and banking movements of the craft would cause the voltages induced in the legs of the pick-ups 10 and 12 to vary so that the fore and aft and transverse legs would respond to the vertical component as well as the horizontal and the vertical leg would respond to the horizontal component as well as the vertical. Novel means are therefore provided by the present invention for so combining the various signal voltages obtained from all of the legs as to neutralize or balance out the signals derived from the vertical component so that the device 16 will be actuated only by signals derived from the horizontal component.

In the form of the invention illustrated, such means includes the gyro vertical 14 which is provided with bank axis trunnions 62, 64 arranged parallel to the longitudinal axis of the craft, and pitch axis trunnions 66, 68 positioned parallel with the transverse axis of the craft. Trunnions 62 and 64 oscillatably support a casing 70 in a gimbal ring 71, while trunnions 66 and 68 oscillatably support the ring 71 in a stationary part, not shown. As is well known, gyro devices of this type employ a rapidly spinning member having its axis arranged vertically, the member being housed within the casing 70. As illustrated, the bank trunnions 62 and 64 are extended and respectively support rotor windings 72 and 74 of variable inductive devices 76 and 78, each of the latter also respectively including right angularly related stator windings 80, 82 and 84, 86 which may be mounted to move with the gimbal 71 relative to wound rotors 72 and 74. In like manner, the pitch trunnions 66 and 68 carry rotor windings 88 and 90 of the respective variable inductive devices 92 and 94, each of the latter also respectively including right-angularly related stator windings 96, 98 and 100, 102. The legs 18, 20 and 22 of the pick-up 10 are respectively connected as by means of pairs of leads 104, 106 and 108 with the stator windings 96, 84 and 86 while legs 40, 42 and 44 of the pick-up 12 are respectively connected as by means of pairs of leads 110, 112 and 114 with the stator windings 100, 82 and 100. Rotor windings 74 and 90 are respectively connected through connections 116 and 118 with the stator windings 98 and 80 while rotor windings 72 and 88 constitute the output windings of the system thus far described, the functioning of these rotor windings being more particularly described hereinafter.

From the foregoing, it will be readily apparent that during normal level flight with the craft headed due north, as indicated by the arrow N, and with the bank axis 62, 64 of the gyro arranged parallel with the axes of the legs 18 and 40, the latter will transmit a maximum voltage to the respective stator windings 96 and 100 due to the horizontal component of the earth's magnetic field. Due to the maximum coupling existing between the stator 96 and the output rotor winding 88, a maximum voltage will also be induced in the latter. On the other hand, the stator 102 has a zero coupling with the rotor 90 and accordingly, no voltage will be induced in the latter winding due to the induced voltage received from the fore and aft leg 40 of the pick-up 12.

In considering the action of the transverse legs 20 and 42 of the pick-ups 10 and 12, since these legs are arranged at right angles to the horizontal component of the earth's field, no voltage will be induced in either of them with the craft heading north. However, should the heading of the craft change, it will be observed that similar voltages will be induced in both of these legs and transmitted to the respective stator windings 84 and 82. Since stator winding 82 has a maximum coupling with the output rotor winding 72, a maximum voltage will be induced in the latter. On the other hand, the stator winding 84 has a zero coupling with the rotor winding 74 and accordingly no voltage will be induced in the latter winding to be transmitted to the output rotor 88 in accordance with that derived from the transverse leg 20 of pick-up 10.

From the foregoing it will be thus observed that during normal level flight, output rotor winding 88 responds only to the voltage induced in the fore and aft leg 18 of pick-up 10, while the output rotor winding 72 responds only to the voltage induced in the transverse leg 42 of the pick-up 12. While the vertical component of the earth's field induces a maximum voltage in both of the vertical legs 22 and 44 of the respective pick-ups 10 and 12, and such maximum voltages will also be induced in the respective rotor windings 74 and 90, due to the maximum coupling existing between the associated stator windings 86 and 100, nevertheless such voltages will not be transmitted to the output rotor windings 88 and 72. This is due to the fact that the stator winding 98 and output rotor winding 88 have a zero coupling, which is also true of the relationship between the stator winding 80 and output rotor winding 72. Hence, the system automatically neutralizes or balances out all the undesirable effects of the vertical component of the earth's field.

Since in the present invention, the pick-ups 10 and 12 are fixedly mounted on the craft, it will be seen that any pitch or bank motion will disturb the above described relationship. This is due to the fact that during pitch, the fore and aft legs 18 and 40 will respond to the vertical as well as the horizontal components of the earth's field. Also the vertical legs will respond to the horizontal, as well as the vertical components. Such response will, of course, be dependent upon the angle of pitch, as well understood. Likewise, during a bank condition, the transverse legs 20 and 42 will respond to the vertical component as well as the horizontal.

One of the features of the present invention accordingly resides in the circuit arrangement previously described and including the association of the pick-ups 10 and 12, and leg construction thereof, whereby even due to pitch, bank or combined pitch and bank movements of the craft, all signals and response to the vertical component of the earth's magnetic field will be eliminated and the output rotor windings 72 and 88 of inductive devices 76 and 92 will respond solely to the horizontal component of the earth's field. Thus, in the event the craft is heading north and is subjected to a pitch condition about the pitch axis 66, 68, relative movement between the trunnions 66, 68, rotors 88 and 90 respectively mounted to move angularly therewith and stator windings 96, 98 and 100, 102 will take place. This will cause rotor 88 to decrease its coupling with stator 96 and increase its coupling with stator 98. Thus, as the voltage induced in the output rotor 88 from the stator 96 connected to the fore and aft leg 18 is decreasing, due to the reduced response of the latter to the horizontal component and due also to the reduction in coupling between windings 88 and 96, the voltage induced in the said output rotor winding 88 from the vertical leg 10 in accordance with the increase in response of the latter to the horizontal component, is increasing. This is due to the increase in coupling between rotor 88 and stator 98, the latter being connected with the rotor 74 which has a maximum coupling with the stator 86. This action results in maintaining the voltage induced in the rotor 88, due to the horizontal component of the earth's field at the proper value regardless of the pitch condition assumed. In this connection it is pointed out that although the voltages induced in the fore and aft leg 18 and the vertical leg 22, due to the vertical component of the earth's field are respectively increasing and decreasing in the stator windings 86 and 98, the resultant voltage induced in the rotor 88 from the vertical signal components will be zero in view of the change in coupling. Thus, the undesired signals due to the vertical component are nullified by the novel constructions proposed, regardless of pitching of the craft.

During the above described pitch action, while the coupling between the rotor winding 90 and the stator windings 102 and 100, respectively connected with the fore and aft leg 40 and the vertical leg 44 of the pick-up 12, is being varied, still no voltage will be induced in the output rotor winding 72 from the associated stator winding 80 due to the zero coupling between these two windings. However, if the craft changes its heading from due north, stator winding 82 will induce a voltage in the output rotor 72 in accordance with the signal derived from the horizontal component by the transverse leg 42, as in the case of the level flight condition heretofore described.

Should the aircraft be subjected to a banking movement about the bank axis 62, 64, relative movement between the trunnions 62, 64, rotors 72 and 74, respectively mounted to move angularly therewith, and stator windings 80, 82 and 84, 86 will take place. This will cause rotor winding 72 to decrease its coupling with stator winding 82 and increase its coupling with stator 80. If the aircraft is heading north, no voltage will be induced in the transverse leg 42 by the horizontal component of the earth's field. On the other hand, if the heading is changed, a voltage will be induced in leg 42 by such component and will be transmitted to stator 82. Thus, as the voltage induced in the output rotor winding 72 from the stator 82 is decreasing, due to the reduction in coupling between the windings 72 and 82 and due also to the reduced response of the transverse leg 42 to the horizontal component, the voltage induced in said output rotor winding 72 from the vertical leg 44 in accordance with the increase in response of the latter to the horizontal component, is increasing. This is due to the increase in coupling between rotor 72 and stator 80, the latter being connected with the rotor 90 which has a maximum coupling with the stator 100. It will thus be seen that the above action results in maintaining the voltage induced in the output rotor 72, due to the horizontal component of the earth's field at the proper value regardless of the assumed bank condition. In this connection it is pointed out that although the voltages induced in the transverse leg 42 and the vertical leg 44, due to the vertical component of the earth's field are respectively increasing and decreasing in the stator windings 82 and 80, the resultant voltage induced in the rotor 72 from the vertical signal components will be zero in view of the change in coupling. Thus, here again, the undesired signals due to the vertical component of the earth's field are neutralized irrespective of the banking of the craft.

During a combined bank and pitch condition of the craft, it will be understood from the foregoing that the described voltage interactions occur in all of the variable inductive devices 76, 78, 92 and 94 and that the respective output rotors 88 and 72 will only reflect signal voltages proportional to the respective fore and aft or longitudinal and the transverse components of the horizontal component of the earth's field, the undesirable effects of the vertical component having been entirely balanced out by the novel arrangement of pick-ups, gyro vertical and variable inductive devices associated therewith.

In order to combine and utilize the component signal voltages induced in the output rotor windings 72 and 88, for directive indicating or control purposes, the said rotor windings are respectively connected through respective pairs of leads 120 and 122 with a pair of non-inductively related stator windings 124 and 126 of a variable inductive coupling device 128. The latter also includes a rotor winding 130, the output of which is connected to the variable field winding 132 of a two-phase induction servomotor 134, as by means of connections 136 and a suitable amplifier 138 for amplifying the output to a desired level. Motor 134 is provided with a fixed field winding 140, energized through connections including a frequency doubler 142 and a phasing condenser 144, from the source of alternating current supply, and the rotor 146 of the motor is connected through suitable connections 148, 149, including a reduction gearing 150, with the rotor 130 of the coupling device 128 and the indicating device 16. As shown, the connections 148, 149 are adapted to rotate the indicator 16 and the rotor winding 130, in order to vary the latter's coupling with respect to the stator windings 124 and 126, the arrangement being such that the rotor will eventually reach a null position with respect to the stator windings. It will be understood that if desired, the connection 149 may be connected with any suitable type of apparatus for securing automatic steering of the craft in response to control movements of said system.

It is believed that the operation of the system has been clearly set forth hereinbefore and that further discussion thereof is not necessary. Regardless of pitch, bank or combined pitch and bank conditions of the craft, it has been demonstrated that the output rotor windings 72 and 88 will respectively respond to the transverse and longitudinal components of the horizontal component of the earth's field, the degree of response of each winding being of course dependent upon the angular relationship with the horizontal component. It has also been demonstrated that undesirable effects and response to the vertical component of the earth's field has been entirely eliminated and will not appear as an effective voltage in either of the windings 72 or 88.

In considering the operation of the coupling device 128 and parts associated therewith, it will be understood that with the parts occupying the null position shown, the resultant voltage induced in the rotor 130 is zero and hence the motor 134 is at rest. As soon, however, as the heading of the craft changes and the signal voltages present in the stator windings 124 and 126 change, a voltage will be induced in the rotor 130 which after amplification, energizes the field winding 132. Motor 134 will immediately begin to operate in the proper direction and through connection 148 and gearing 150 will move rotor 130 back to a new null position. At the same time connection 149 will move the indicator 16 to indicate the new heading of the craft.

There is thus provided by the present invention, a novel arrangement for obtaining course indication and/or control through the use of inductive apparatus which may be fixedly mounted on the craft and without the necessity of stabilizing such apparatus in a horizontal plane. The novel construction and circuit connections disclosed and including the variable inductive devices and gyro vertical, function in a new and improved manner to eliminate all signals due to the earth's vertical component and utilize only those signals which are derived from the horizontal component, regardless of pitch, bank or combined pitch and bank movements of the craft. While the mechanism is especially adapted for use on aircraft, it will be understood that the same is not limited to such use but may be employed in connection with water craft or land vehicles, if desired.

While one embodiment of the invention has been disclosed and described herein, various changes may be resorted to, as will be readily understood by those skilled in the art without departing from the scope of the invention. Reference will therefore be had to the appended claims for a definition of the limits of the invention.

What is claimed is:

1. Mechanism responsive to changes in the heading of a craft in accordance with the relative position thereof with respect to the horizontal component of the earth's magnetic field, comprising a pair of magnetic pick-ups each of which comprises three earth inductor elements having their axes mutually perpendicular to each other and arranged parallel to the longitudinal, transverse and vertical axes of the craft for deriving a plurality of signals from the horizontal and vertical components of the earth's magnetic field in accordance with the heading, pitch and bank conditions of the craft, a gyro vertical having its bank and pitch axes positioned parallel to the longitudinal and transverse axes of the craft, a pair of variable inductive devices each having a pair of stator windings and a rotor winding, the rotor windings being associated with the pitch axis of the gyro and movable relative to the stator windings to vary the coupling therebetween during pitch of the craft, a second pair of variable inductive devices each having a pair of stator windings and a rotor winding, the rotor windings being associated with the bank axis of the gyro and movable relative to the stator windings to vary the coupling therebetween during bank of the craft, the signals induced in the earth inductor elements parallel to the longitudinal axis of the craft being impressed on the stator coils associated with the bank axis of the gyro, the signals induced in the inductor elements parallel to the transverse axis of the craft being impressed on the stator coils associated with the pitch axis of the gyro, and those induced in the elements parallel to the vertical axis being impressed on the stator coils associated with the pitch and bank axis of the gyro; and means responsive to the signals induced in the rotor windings of said variable inductive devices and displaceable in accordance with the magnetic heading.

2. Mechanism for providing a magnetic direction reference upon a craft from the earth's magnetic field, comprising a first non-stabilized earth inductor means adapted to be fixedly mounted upon the craft for angular movements therewith about the longitudinal and transverse axes thereof and responsive to both the horizontal and vertical components of the earth's magnetic field for producing electromagnetic effects therefrom, a second non-stabilized earth inductor means also adapted to be fixedly mounted upon the craft for angular movements therewith about the longitudinal and transverse axes thereof and also responsive to both the horizontal and vertical components of the earth's magnetic field for producing electromagnetic effects therefrom, said second earth inductor means being independent of said first earth inductor means and positioned on said craft at a different location from said first earth inductor means, electromagnetically operated controlling means, and stabilized means interconnecting said first and second earth inductor means with said controlling means for eliminating the electromagnetic effects of one of the components of the earth's magnetic field from the outputs of both of said earth inductor means, to actuate said controlling means in response to the electromagnetic effects of the other of said components of the earth's magnetic field from both of said earth inductor means.

3. Mechanism for providing a magnetic direction reference upon a craft from the earth's magnetic field, comprising a first non-stabilized earth inductor means adapted to be fixedly mounted upon the craft for angular movements therewith about the longitudinal and transverse axes thereof and responsive to both the horizontal and vertical components of the earth's magnetic field for producing electromagnetic effects therefrom, a second non-stabilized earth inductor means also adapted to be fixedly mounted upon the craft for angular movements therewith about the longitudinal and transverse axes thereof and also responsive to both the horizontal and vertical components of the earth's magnetic field for producing electromagnetic effects therefrom, said second earth inductor means being independent of said first earth inductor means and positioned on said craft at a different location from said first earth inductor means, electromagnetically operated controlling means, and stabilized means interconnecting said first and second earth inductor means with said controlling means for eliminating the electromagnetic effects of the vertical component of the earth's magnetic field from the outputs of both of said earth inductor means to actuate said controlling means in response to the electromagnetic effects of the horizontal component of the earth's magnetic field from both of said earth inductor means.

4. Mechanism for providing a magnetic direction reference upon a craft from the earth's magnetic field, comprising a first non-stabilized earth inductor means adapted to be fixedly mounted upon the craft for angular movements therewith about the longitudinal and transverse axes thereof and responsive to both the horizontal and vertical components of the earth's magnetic field for producing electromagnetic effects therefrom, a second non-stabilized earth inductor means also adapted to be fixedly mounted upon the craft for angular movements therewith about the longitudinal and transverse axes thereof and also responsive to both the horizontal and vertical components of the earth's magnetic field for producing electromagnetic effects therefrom, said second earth inductor means being independent of said first earth inductor means and positioned on said craft at a different location from said first earth inductor means, electromagnetically operated controlling means, and gyroscopically controlled means interconnecting said first and second earth inductor means with said controlling means for eliminating the electromagnetic effects of one of the components of the earth's magnetic field from the outputs of both of said earth inductor means, to actuate said controlling means in response to the electromagnetic effects of the other of said components of the earth's magnetic field from both of said earth inductor means.

5. Mechanism for providing a magnetic direction reference upon a craft from the earth's magnetic field, comprising a first non-stabilized earth inductor means adapted to be fixedly mounted upon the craft for angular movements therewith about the longitudinal and transverse axes thereof and responsive to both the horizontal and vertical components of the earth's magnetic field for producing electromagnetic effects therefrom, a second non-stabilized earth inductor means also adapted to be fixedly mounted upon the craft for angular movements therewith about the longitudinal and transverse axes thereof and also responsive to both the horizontal and vertical components of the earth's magnetic field for producing electromagnetic effects therefrom, said second earth inductor means being independent of said first earth inductor means and positioned on said craft at a different location from said first earth inductor means, electromagnetically operated controlling means, and gyroscopically controlled means interconnecting said first and second earth inductor means with said controlling means for eliminating the electromagnetic effects of the vertical component of the earth's magnetic field from the outputs of both of said earth inductor means, to actuate said controlling means in response to the electromagnetic effects of the horizontal component of the earth's magnetic field from both of said earth inductor means.

6. Mechanism for providing a magnetic direction reference on a craft from the earth's magnetic field, comprising a first and second non-stabilized earth inductor means adapted to be fixedly mounted at different locations on the craft for relative angular movements therewith about the longitudinal and transverse axes thereof and responsive to both the horizontal and vertical components of the earth's magnetic field, each of said earth inductor means including a plurality of earth inductor elements mutually perpendicular to each other, electromagnetically operated controlling means adapted to be operated by both of said earth inductor means, a free gyroscope adapted to be mounted upon the craft remotely from both of said earth inductor means for relative angular movements with rerespect to the craft during angular movements of the craft about its longitudinal and transverse axes, a plurality of take-off means associated with said gyroscope and each including a stator means and a rotor means, some of said stator means being electrically connected to one of said earth inductor means and operatively associated with their respective rotor means for eliminating the electromagnetic effects of the vertical component of the earth's magnetic field from the output of said one earth inductor means, other of said stator means being electrically connected to the other of said earth inductor means and operatively associated with their respective rotor means for eliminating the electromagnetic effects of the vertical component of the earth's magnetic field from the output of the other of said earth inductor means, and some of said stator means also being connected to the rotor means associated with the other stator means, some of said rotor means being actuated by said gyroscope upon relative angular movement thereof about one axis and other of said rotor means being actuated by said gyroscope upon relative angular movement thereof about the other axis, and means connecting certain of said rotor means to said electromagnetically operated controlling means for actuating the latter in response to the electromagnetic effects of the horizontal component of the earth's magnetic field.

7. Mechanism for providing a magnetic direction reference on a craft from the earth's magnetic field, comprising a first and second non-stabilized earth inductor means adapted to be fixedly mounted at different locations on the craft for angular movements therewith about the longitudinal and transverse axes thereof for producing electrical signals from the horizontal and vertical components of the earth's magnetic field, electrically operated controlling means, means adapted to be mounted on the craft to respond to angular movements of the craft about its longitudinal and transverse axis, and means electrically interconnecting said first and second earth inductor means with said controlling means, including means actuated by the means responsive to the angular movements of the craft for eliminating the signals produced from one of the components of the earth's magnetic field, to actuate said controlling means in response to the signals produced from the other component of the earth's magnetic field.

8. Mechanism for providing a magnetic direction reference on a craft from the earth's magnetic field, comprising a first and second non-stabilized earth inductor means adapted to be fixedly mounted at different locations on the craft for angular movements therewith about the longitudinal and transverse axes thereof for producing electrical signals from the horizontal and vertical components of the earth's magnetic field, electrically operated controlling means, means adapted to be mounted on the craft to respond to angular movements of the craft about its longitudinal and transverse axes, and means electrically interconnecting said first and second earth inductor means with said controlling means, including means actuated by the means responsive to the angular movements of the craft for eliminating the signals produced from the vertical component of the earth's magnetic field, to actuate said controlling means in response to the signals produced from the horizontal component of the earth's magnetic field.

9. Mechanism for providing a magnetic direction reference on a craft from the earth's magnetic field, comprising a first and second non-stabilized earth inductor means adapted to be fixedly mounted at different locations on the craft for angular movements therewith about the longitudinal and transverse axes thereof for producing electrical signals from the horizontal and vertical components of the earth's magnetic field, electrically operated controlling means, a free gyroscope adapted to be mounted on the craft at a point remote from said first and second earth inductor means for angular movement relative to the craft about the longitudinal and transverse axes thereof, and means electrically interconnecting said first and second earth inductor means with said controlling means, including means actuated by said gyroscope upon relative angular movement between it and the craft about said longitudinal and transverse axes for eliminating the signals produced from one of the components of the earth's magnetic field, to actuate said controlling means in response to the signals produced from the other component of the earth's magnetic field.

10. Mechanism for providing a magnetic direction reference on a craft from the earth's magnetic field, comprising a first and second non-stabilized earth inductor means adapted to be fixedly mounted at different locations on the craft for angular movements therewith about the longitudinal and transverse axes thereof for producing electrical signals from the horizontal and vertical components of the earth's magnetic field, electrically operated controlling means, a free gyroscope adapted to be mounted on the craft at a point remote from said first and second earth inductor means for angular movement relative to the craft about the longitudinal and transverse axes thereof, and means electrically interconnecting said first and second earth inductor means with said controlling means, including means actuated by said gyroscope upon relative angular movement between it and the craft about said longitudinal and transverse axes for eliminating the signals produced from the vertical component of the earth's magnetic field, to actuate said controlling means in response to the signals produced from the horizontal component of the earth's magnetic field.

11. Mechanism for providing a magnetic direction reference on a craft from the earth's magnetic field, comprising first and second non-stabilized earth inductor means adapted to be fixedly mounted at different locations on the craft for angular movements therewith about the longtiudinal and transverse axes thereof for producing electrical signals from the horizontal and vertical components of the earth's magnetic field, each of said earth inductor means including a plurality of earth inductor elements mutually perpendicular to each other, electrically operated controlling means, a free gyroscope adapted to be mounted upon the craft remotely from said first and second earth inductor means for relative angular movements with respect to the craft during angular movements of the craft about its longitudinal and transverse axes, the roll and pitch axes of said gyroscope being parallel to the longitudinal and transverse axes of the craft respectively, a pair of take-offs each of which includes a stator and a rotor, the stator of one of said take-offs being electrically connected to one of said earth inductor means and the stator of the other take-off being electrically connected to the other of said earth inductor means, the rotor of each of said take-offs being associated with the pitch axis of the gyroscope and movable relative to its respective stator for eliminating the signals produced from the vertical component of the earth's magnetic field during pitch of the craft, a second pair of take-offs each of which includes a stator and a rotor, the stator of one of said take-offs being electrically connected to one of said earth inductor means and the stator of the other of said take-offs being electrically connected to the other of said earth inductor means, the rotor of each of said second pair of take-offs being associated with the roll axis of the gyroscope and movable relative to its respective stator for eliminating the signals produced from the vertical component of the earth's magnetic field, and means connecting one of the rotors of each pair of said take-offs to said electrically operated controlling means, the other rotor of one pair of take-offs being electrically connected to the stator of one of the other pair of take-offs and the other rotor of the other pair of take-offs being electrically connected to the stator of the first pair of take-offs,

13 for actuating said electrically operated controlling means in response to the signals produced from the horizontal component of the earth's magnetic field.

12. Mechanism for providing a magnetic direction reference on a craft from the earth's magnetic field, comprising a first and second non-stabilized earth inductor means adapted to be fixedly mounted at different locations on the craft for angular movements therewith about the longitudinal and transverse axes thereof for deriving a plurality of signals from the horizontal and vertical components of the earth's magnetic field in accordance with the heading, pitch and roll conditions of the craft, a free gyroscope adapted to be mounted on said craft remotely from said first and second earth inductor means for angular movement relative to the craft about the longitudinal and transverse axes thereof, a first pair of variable inductive devices associated with said gyroscope for actuation thereby about one axis thereof, a second pair of variable inductive devices associated with said gyroscope for actuation thereby about the other axis thereof, electrically operated controlling means, means connecting one of each pair of said inductive devices to said first and second earth inductor means respectively and one of the inductive devices of one pair being connected to one of the inductive devices of the other pair for eliminating the signals derived from the vertical component of the earth's magnetic field, and means connecting one of each pair of said inductive devices to said electrically operated controlling means.

13. Mechanism for indicating magnetic direction, comprising a first and second non-stabilized earth inductor means adapted to be fixedly mounted at different locations upon a craft for relative angular movements therewith about the longitudinal and transverse axes of said craft, each of said earth inductor means including a plurality of earth inductor elements having their axes mutually perpendicular to each other for generating signals in response to the horizontal and vertical components of the earth's magnetic field, two pairs of variable inductive elements each of which comprises two stationary coils 90° out of phase geometrically with respect to each other and a rotatable coil in inductive relation with said two stationary coils, an artificial horizon gyroscope adapted to be mounted upon the craft remotely from said first and second earth inductor means for relative angular movements with respect to said craft during angular movements thereof about its longitudinal and transverse axes, one of the stationary coils of one of the first pair of said inductive elements being electrically connected to one of the rotatable coils of one of the other pair of inductive elements and the other stationary coil of said one of the first pair of inductive elements being electrically connected to one of the earth inductor means, one of the stationary coils of one of the other pair of inductive elements being electrically connected to the rotatable coil of the other of said first pair of inductive elements and the other stationary coil of one of the other pair of inductive elements being electrically connected to the other earth inductor means, the rotatable coils of one pair of said inductive elements being actuated by said gyroscope upon relative angular movement thereof about one axis and the rotatable coils of the other pair being actuated by said gyroscope upon relative angular movement thereof about the other axis for eliminating the signals derived from the vertical component of the earth's magnetic field, and indicating means including means connected to the other rotatable coil of each pair of inductive devices for actuating said indicating means in response to the signals produced by the horizontal component of the earth's magnetic field to indicate magnetic direction.

14. Magnetic indicating and control mechanism for aircraft, comprising means for deriving component signals from the horizontal component of the earth's magnetic field, including a first and second earth inductor means fixedly mounted at different locations on the aircraft, each earth inductor means having a pair of horizontal inductor elements respectively arranged parallel to the longitudinal and transverse axes of the aircraft and a vertical inductor element, said elements responding to the vertical component as well as the horizontal component of the earth's magnetic field to produce vertical component signals in addition to horizontal component signals when the aircraft pitches and banks, a free gyroscope adapted to be mounted on said aircraft remotely from said first and second earth inductor means for relative angular movement with respect to said aircraft when said aircraft pitches and banks, two pairs of variable inductive devices each of which includes stator means and rotor means, the rotor means of each of one pair of said inductive devices being actuated by said gyroscope upon angular movement thereof about one axis and the rotor means of each of the other pair of inductive elements being actuated by the gyroscope upon angular movement thereof about the other axis, one of the stator means of one of each pair of said inductive elements being electrically connected to said first and second earth inductor means respectively, and the stator means of one of the inductive elements of one pair being connected to one of the rotor means of one of the other pairs of inductive elements and the stator means of one of the other pair of inductive elements being connected to the rotor means of one of the first pair of elements, the actuation of the rotor means of said variable inductive elements being effective to eliminate the signals derived from the vertical component of the earth's magnetic field, and indicating means including means connected to one of the rotor means of each pair of said inductive elements for actuating said indicating means in response to the signals from the horizontal component of the earth's magnetic field.

ALFRED A. STUART, JR.

REFERENCES CITED

The following references are of record in the file of this patent:

UNITED STATES PATENTS

| Number | Name | Date |
|---|---|---|
| 2,241,499 | Barth | May 13, 1941 |
| 2,383,461 | Esval et al. | Aug. 28, 1945 |
| 2,459,830 | McCarthy | Jan. 25, 1949 |

FOREIGN PATENTS

| Number | Country | Date |
|---|---|---|
| 591,019 | Great Britain | Aug. 5, 1947 |
| 624,083 | Great Britain | May 27, 1949 |
| 666,594 | Germany | Oct. 24, 1938 |